(12) United States Patent
Passoni (10) Patent No.: US 11,696,072 B2
(45) Date of Patent: Jul. 4, 2023

(54) METHOD AND CIRCUIT FOR OPERATING ELECTRO-ACOUSTIC TRANSDUCERS FOR RECEPTION AND TRANSMISSION USING RING-DOWN PARAMETERS

(71) Applicant: STMicroelectronics S.r.l., Agrate Brianza (IT)

(72) Inventor: Marco Passoni, Cornate d'Adda (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/517,273

(22) Filed: Nov. 2, 2021

(65) Prior Publication Data

US 2022/0150625 A1 May 12, 2022

(30) Foreign Application Priority Data

Nov. 9, 2020 (IT) .................. 102020000026663

(51) Int. Cl.
*G01H 11/08* (2006.01)
*H04R 3/04* (2006.01)
*G01H 13/00* (2006.01)

(52) U.S. Cl.
CPC ............. *H04R 3/04* (2013.01); *G01H 11/08* (2013.01); *G01H 13/00* (2013.01)

(58) Field of Classification Search
None
See application file for complete search history.

(56) References Cited

U.S. PATENT DOCUMENTS

| 5,267,219 | A | 11/1993 | Woodward |
| 5,335,545 | A | 8/1994 | Leszczynski |
| 7,004,031 | B2 | 2/2006 | Oda et al. |
| | | (Continued) | |

FOREIGN PATENT DOCUMENTS

GB 2567748 A 4/2019

OTHER PUBLICATIONS

De Marneffe, B. et al., "Vibration damping with negative capacitance shunts: theory and experiment," *Smart Materials and Structures*, vol. 17, 2008, 10 pages.

(Continued)

*Primary Examiner* — James K Mooney
(74) *Attorney, Agent, or Firm* — Seed Intellectual Property Law Group LLP (57) ABSTRACT

An electro-acoustical transducer such as a Piezoelectric Micromachined Ultrasonic Transducers is coupled with an adjustable load circuit having a set of adjustable load parameters including resistance and inductance parameters. Starting from at least one resonance frequency or at least one ring-down parameter of the electro-acoustical transducer a set of model parameters is calculated for a Butterworth-Van Dyke (BVD) model of the electro-acoustical transducer. The BVD model includes an equivalent circuit network having a constant capacitance coupled to a RLC branch and the adjustable load circuit is coupled with the electro-acoustical transducer at an input port of the equivalent circuit network of the model of the electro-acoustical transducer. The adjustable load parameters are adjusted as a function of the set of model parameters calculated for the BVD model of the electro-acoustic transducer to increase the bandwidth or the sensitivity of the electro-acoustic transducer.

20 Claims, 8 Drawing Sheets

(56) References Cited

U.S. PATENT DOCUMENTS

| | | |
|---|---|---|
| 7,006,641 B1 | 2/2006 | Saiki et al. |
| 10,768,706 B1 | 9/2020 | Wang et al. |
| 2003/0039173 A1 | 2/2003 | Yurchenko et al. |
| 2004/0236217 A1* | 11/2004 | Cerwin ............... A61B 5/416 600/437 |
| 2010/0011471 A1 | 1/2010 | Jesse et al. |
| 2013/0181573 A1 | 7/2013 | Hines et al. |
| 2016/0380640 A1 | 12/2016 | Boser et al. |
| 2017/0074977 A1 | 3/2017 | Koudar et al. |
| 2017/0115382 A1 | 4/2017 | Koudar et al. |
| 2017/0168151 A1 | 6/2017 | Kim |
| 2019/0033434 A1 | 1/2019 | Ding et al. |
| 2020/0174116 A1* | 6/2020 | Toda ................... G01S 15/102 |
| 2020/0292684 A1 | 9/2020 | Passoni et al. |

OTHER PUBLICATIONS

Hong, E. et al., "Vibration of Micromachined Circular Piezoelectric Diaphragms," *IEEE Transactions on Ultrasonics, Ferroelectrics, and Frequency Control*, vol. 53, No. 4, Apr. 2006, pp. 697-706.

Kumar, U. et al., "Analytical Study of Inductor Simulation Circuits," *Active and Passive Electronic Components*, vol. 13, 1989, pp. 211-227.

Massimino, G. et al., "Multiphysics modelling and experimental validation of an air-coupled array of PMUTs with residual stresses," *Journal of Micromechanics and Microengineering*, vol. 28, 2018, 054005, pp. 1-9.

Moon, J.Y. et al., "Electrical impedance matching networks based on filter structures for high frequency ultrasound transducers," *Sensors and Actuators A: Physical*, vol. 251, 2016, pp. 225-233.

Przybyla, R. et al., "In-Air Rangefinding With an AlN Piezoelectric Micromachined Ultrasound Transducer," *IEEE Sensors Journal*, vol. 11, No. 11, Nov. 2011, pp. 2690-2697.

Karuthedath, C. et al., "Design and Fabrication of Aluminum Nitride Piezoelectric Micromachined Ultrasonic Transducers for Air Flow Measurements," *IEEE International Ultrasonics Symposium (IUS)*, Glasgow, Scotland, Oct. 6-9, 2019, pp. 2489-2492.

Ramos, A. et al., "Improvement inTransient Piezoelectric Responses of NDE Transceivers Using Selective Damping and Tuning Networks," *IEEE Transactions on Ultrasonics, Ferroelectrics and Frequency Control*, vol. 47, No. 4, Jul. 2000, pp. 826-835.

Robichaud, A. et al., "Frequency Tuning Technique of Piezoelectric Ultrasonic Transducers for Ranging Applications," *Journal of Microelectromechanical Systems*, vol. 27, No. 3, Jun. 2018, pp. 570-579.

Rozen, O. et al., "Monolithic MEMS-CMOS Ultrasonic Rangefinder based on Dual-Electrode PMUTs," *IEEE 29th International Conference on Micro Electro Mechanical Systems (MEMS)*, Jan. 2016, pp. 115-118.

Przybyla et al., "3D Ultrasonic Gesture Recognition," IEEE International Solid-State Circuits Conference, Session 12, Sensors, MEMS, and Displays, 12.1, Feb. 11, 2014, 3 pages.

Svilainis et al., "Optimization of the Ultrasonic Excitation Stage," Proceedings of the ITI 2008 30th International Conference on Information Technology Interfaces, Jun. 23-26, 2008, Cavtat, Croatia, pp. 791-796.

\* cited by examiner

METHOD AND CIRCUIT FOR OPERATING ELECTRO-ACOUSTIC TRANSDUCERS FOR RECEPTION AND TRANSMISSION USING RING-DOWN PARAMETERS

BACKGROUND

Technical Field

The description relates to electro-acoustic transducers, that is, components capable of converting electrical signals into acoustic signals and/or vice versa.

Ultrasonic transducers are exemplary of such transducers.

Description of the Related Art

Ultrasonic transducers can be considered for use in various applications.

For instance, they may be used in acoustic location methods in vehicles, wherein (ultra)sound waves can be used to determine the distance and/or the direction of a source or reflector.

Such transducers can be used in techniques based on the Doppler effect and/or measuring the time-of-flight (TOF) of sound waves. Obstacle detection (mono-, bi-, three-dimensional), volume measurement, gesture recognition and (Doppler-based) flow metering are exemplary of possible fields of application.

Ultrasonic transducers currently referred to as PMUTs (Piezoelectric Micromachined Ultrasonic Transducers) are MEMS-based piezoelectric transducers (where MEMS is an acronym for Micro Electro-Mechanical Systems) which, unlike bulk piezoelectric transducers which rely on thickness-mode motion, take advantage of the flexural motion of a thin membrane coupled with a thin piezoelectric film.

In comparison with bulk transducers, PMUTs may exhibit an underdamped mechanical response so that, once the membrane is moved from the steady state position return to rest involves many oscillation cycles; this may be due to a reduced internal energy loss of the transducer (thanks to the miniaturized silicon membrane) and to a reduced damping exerted by the medium (air). In other words, they may exhibit a narrower bandwidth, which may affect duration, accuracy and resolution of measurements in applications (e.g., in a distance measurement) exploiting PMUTs since exciting and damping the membrane may involve several oscillating cycles, possible differences in the resonance frequencies of each individual membrane due to manufacturing tolerances, Consequently, certain advantages related to the use of PMUTs (such as small dimensions and low driving voltages) may be undesirably counterbalanced by the narrower bandwidth available, dependency on manufacturing tolerances, resonance frequency differences.

In applications where multiple PMUTs are used, such as echo-location, for instance, mechanical cross-talk combined with narrow bandwidth may limit the capability of measuring close objects as the receiver membrane(s) may be "hindered" for an undesirable amount of time.

Further issues may arise related to an undesired spread of the values of certain (mechanical) parameters of different PMUTs, in particular resonance frequency, with low damping likely to further hinder communication between different PMUT devices (e.g., with transmitters and receivers unable to communicate with each other).

Italian Patent Application n. 102019000003613 addresses the problem of resonance frequency spread by leveraging a dependence of the resonance frequency on the voltage bias.

Various documents are exemplary of activity devoted to bandwidth manipulation methods in transducers as considered herein.

For instance, Robichaud, A., P. Cicek, D. Deslandes and F. Nabki. "Frequency Tuning Technique of Piezoelectric Ultrasonic Transducers for Ranging Applications." Journal of Microelectromechanical Systems 27 (2018): 570-579, doi: 10.1109/JMEMS.2018.2831638 discusses a low-cost technique for the frequency tuning of piezoelectric micromachined ultrasonic transducers (PMUT) with resonance frequencies of the first and second modes at 1.4 MHz and 5 MHz, respectively. The technique is based on a single post-processing deposition of Parylene-C on all elements of a chip, resulting in a uniform frequency tuning of all exposed elements.

B. de Marneffe and A. Preumont, "Vibration damping with negative capacitance shunts: theory and experiment", in Smart Materials and Structures, 2008, doi: 10.1088/0964-1726/17/3/035015 discusses enhancement of piezoelectric stack transducers by means of the well-known 'negative' capacitive shunting, where two different implementations (series vs parallel) are investigated, and the parallel is applied on a truss structure.

Ramos A, San Emeterio J L, Sanz P T. Improvement in transient piezoelectric responses of NDE transceivers using selective damping and tuning networks. IEEE Trans Ultrason Ferroelectr Freq Control. 2000; 47(4):826-35. doi: 10.1109/58.852064 discusses NDE ultrasonic applications for quality control purposes, based on piezoelectric devices working as pulsed ultrasonic probes, usually including some tuning circuit either across the pulser output connectors or close to the piezoelectric probe electrodes, wherein the positive influences of certain selective damping and tuning networks on the time and frequency behaviors of NDE piezoelectric transceivers are analyzed in detail.

J. Y. Moon, J. Lee, J. H. Chang, "Electrical impedance matching networks based on filter structures for high frequency ultrasound transducers" in Sens. Actuators A, 2016, doi: 10.1016/j.sna.2016.10.025 discusses an electrical impedance matching (EIM) network is proposed to achieve the broad bandwidth of a high frequency ultrasound transducer and to improve the signal-to-noise ratio (SNR) of an ultrasound image, where the EIM network is based on a general filter structure, i.e., either low-pass filter (LPF) or high-pass filter (HPF) structure composing a capacitor and an inductor.

Existing solutions present drawbacks such as:
increased complexity and costs, e.g., due to introducing additional manufacturing steps;
bandwidth increase involves sensitivity reduction; and
unsuitability for transceiver operations, burdensome arrangements versus limited improvements.

BRIEF SUMMARY

Despite the activity in the field, there is an interest in providing further improved solutions, capable of overcoming drawbacks of existing solutions.

Embodiments of the present disclosure contribute in providing such improved solutions.

According to one or more embodiments, a method is provided that includes: obtaining at least one of a resonance frequency and at least one ring-down parameter of an electro-acoustical transducer having a sensitivity and a frequency bandwidth; calculating, as a function of the at least one of a resonance frequency and at least one ring-down parameter, a set of model parameters of a Butterworth-Van Dyke (BVD) model of the electro-acoustical transducer, the BVD model including an equivalent circuit network having a constant capacitance coupled to a RLC branch; coupling with the electro-acoustical transducer an adjustable load circuit, the adjustable load circuit having a set of adjustable load parameters including at least one resistance parameter and one inductance parameter, wherein the adjustable load circuit is coupled with the electro-acoustical transducer at an input port of the equivalent circuit network of the BVD model of the electro-acoustical transducer; and adjusting the set of adjustable load parameters as a function of the calculated set of model parameters of the BVD model of the electro-acoustic transducer to increase at least one of the bandwidth and the sensitivity of the electro-acoustic transducer as a result of the adjusting.

One or more embodiments may relate to a corresponding circuit.

One or more embodiments may relate to a corresponding device (an acoustic location sensor module being exemplary of such a device).

Obstacle detection systems (for use in the automotive field, for instance), volume measurement systems, gesture recognition systems or flow metering systems are exemplary of such systems.

The claims are an integral part of the technical teaching provided herein with reference to the embodiments.

One or more embodiments may facilitate widening bandwidth while reaching or maintaining adequate sensitivity levels of ultrasonic transducers.

BRIEF DESCRIPTION OF THE SEVERAL VIEWS OF THE DRAWINGS

One or more embodiments will now be described, by way of example only, with reference to the annexed figures wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

It will be otherwise appreciated that one or more embodiments apply to electro-acoustic transducers, that is components capable of acting as transducers between the electrical domain and the acoustical domain, by converting electrical signals into acoustic signals—and/or—converting acoustic signals into electrical signals; that is, the wording "electro-acoustic" is in no way to be construed, even indirectly, as limited to converting electrical signals into acoustic signals.

Also, the exemplary description provided in the following will refer for simplicity and ease of understanding to arrangements comprising at least one of a "transmitter" section, configured to convert electrical signals into acoustic signals transmitted (towards an obstacle, for instance), and a "receiver" section, configured to convert acoustical signals received (as reflected from an obstacle, for instance) into electrical signals.

However, the embodiments are not limited to such possible arrangements and can be advantageously applied to arrangements including both a "transmitter" section and a "receiver" section, called "transceiver" for brevity.

Likewise, while the exemplary description provided in the following will refer for simplicity and ease of understanding to ultrasound transducers, one or more embodiments may apply, in general, to electro-acoustic transducers capable of acting as transducers between the electrical domain and the acoustical domain. In that respect, while PMUTs will be referred throughout for simplicity and ease of understanding, the embodiments can be advantageously applied to electro-acoustic transducers other than PMUTs where issues such as those discussed in the foregoing may arise.

Finally, while one or more embodiments may contemplate using distinct transducers for transmission and reception, certain embodiments may contemplate a single transducer configured to operate both as a transmitter and a receiver.

Figure 1:
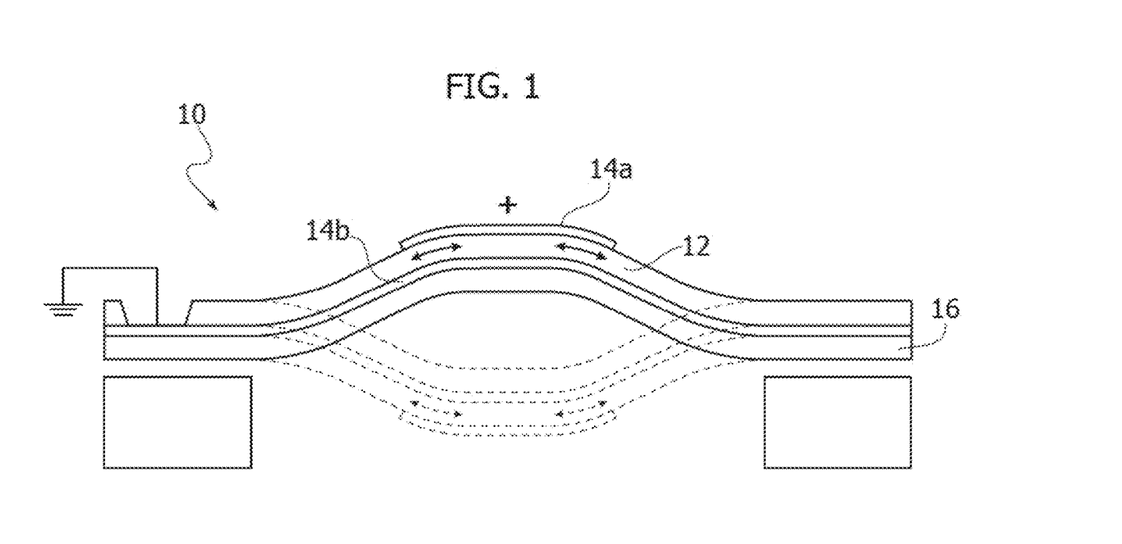
FIG. 1 is a diagram of working principles of a PMUT transducer device.

As exemplified in FIG. 1, a PMUT transducer device 10 comprises a MEMS-based piezoelectric layer 12 sandwiched between electrodes or terminals 14a and 14b and suspended over a (silicon) substrate 16, forming a membrane stack 14a, 12, 14b, 16.

A device 10 as exemplified herein can be used either as a transmitter or as a receiver.

When operated as a transmitter, a voltage generator configured to produce an alternating voltage is connected to the contacts 14a, 14b, so that a corresponding electric field is produced in the piezoelectric layer 12, inducing a deformation thereof (due to the inverse piezoelectric effect) and so that, also due to the geometry of the device 10, the induced deformation further induces a deflection of the membrane, with a corresponding pressure wave emission in the surrounding medium.

When operated as a receiver, an incoming pressure wave induces a deflection of the piezoelectric layer 12, leading to a charge polarization being induced at the transducer contacts 12a, 12b as a result of the (direct) piezoelectric effect;

this polarization can be detected by an amplifier connected to the transducer terminals 14a, 14b (for example, a transimpedance amplifier).

FIG. 1 illustrates possible opposed deflections or deformations of the layer 12 occurring as a result of applying at its contacts 14a, 14b a proper alternating voltage.

As discussed, the number of membranes used can be from one (a membrane stack used for transmission and then switched to be a receiver) to more than one in transmission and more than one in reception.

For example, using a plurality of membranes may be advantageous when performing 2D or 3D echo-location as this may increase sensitivity either in transmission or reception. Sensitivity may be defined as the maximum (amplitude) value of the associated frequency response or transfer function.

An arrangement as exemplified in FIG. 1 is otherwise conventional in the art, which makes it unnecessary to provide a more detailed description herein.

As discussed in the foregoing, an obstacle detection/ranging transducer arrangement as considered herein is exemplary of a variety of possible applications (volume measurement, gesture recognition, flow metering, just to mention a few), these applications including applications where only a "transmitter" section or only a "receiver" section is contemplated.

As discussed, when ultrasound transducers such as PMUTs 10 are used in such applications, the bandwidths of the transmitter section and/or the receiver section may not overlap, or overlap only partly, so that information on the reflected sound may hardly be present or even be absent in the signal acquired.

Figure 2:
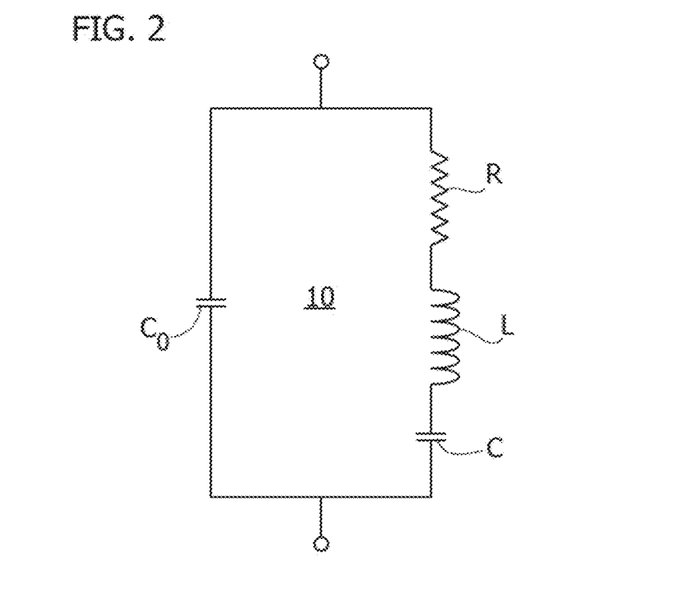
FIGS. 2, 3A, 3B, 4 and 5 are illustrative of a model applicable in embodiments.

As exemplified in FIG. 2, a piezoelectric ultrasonic transducer device 10 exemplified in FIG. 1 can be modeled using the Butterworth-Van-Dyke model (BVD).

As known to those of skill in the art, the BVD model is an electrical equivalent network of lumped elements that models the behavior of the device 10 in at least one of a mechanical, acoustic and electrical domains.

Just by way of background, the Butterworth-Van Dyke model (also known as a "Mason" or "KLM" model) is an electrical equivalent circuit of an electro-acoustical transducer comprising an electrical domain coupled, via an electrical-mechanical coupling, to a mechanical domain (notionally having plural normal modes). The mechanical domain is in turn coupled, via a mechanical-acoustic coupling, to an acoustic domain. The Butterworth-Van Dyke/Mason/KLM is otherwise known to those of skill in the art, which makes it unnecessary to provide a more detailed description herein.

Being an electrical equivalent circuit, the electrical domain can be represented, as exemplified in FIG. 2, using an equivalent network as seen at the electrical contacts or terminals 14a, 14b, e.g., when an impedance measurement is performed, the equivalent network comprising a capacitance of value $C_0$ in parallel with a RLC branch comprising the series connection of a resistance of value R, an inductance of value L and a capacitance of value C.

Figure 3A:
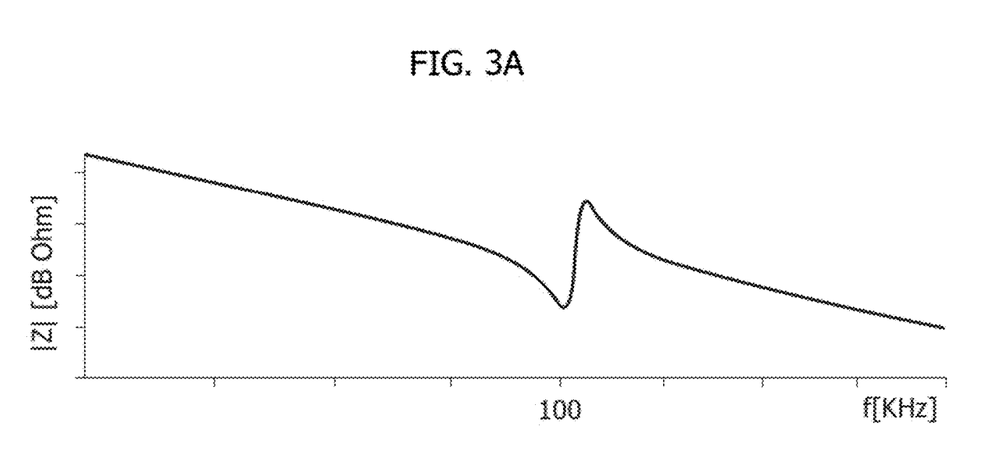
Figure 3B:
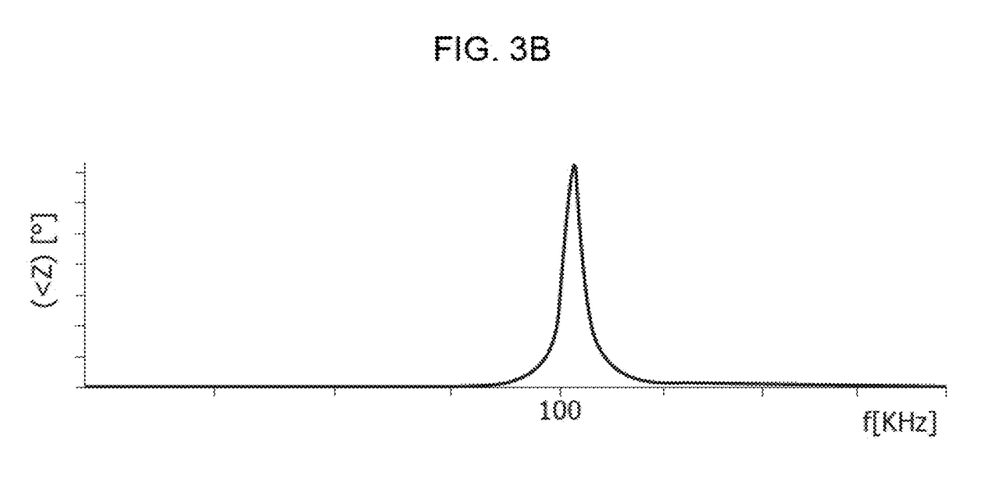

FIGS. 3A and 3B are exemplary diagrams of the amplitude (dB Ohm—ordinate scale in FIG. 3A) and phase (degrees—ordinate scale in FIG. 3B) versus frequency (kHz—abscissa scale in both FIGS. 3A and 3B) of the impedance Z as seen at the input port of the equivalent circuit discussed with reference to FIG. 2.

The following relationships may apply to the equivalent circuit as exemplified in FIG. 2:

$$f_0 = (1/2\pi)(L/[C_0C/(C_0+C)])^{1/2}$$

$$\tau = 2(L/R)$$

where $f_0$ and $\tau$ indicate resonance frequency and decay time, respectively. These may be obtained from measurement/detection of a ring-down signal, as discussed in the following.

Having two equations and four unknowns, namely the BVD model parameters L, R, C, $C_0$, such a system does not admit a univocal solution. However, in the present context (PMUTs, for instance), the (judicious) assumption can be made that $C_0$ is much larger than C (so that a constant value can be used for $C_0$). A value for the resistance R can be determined a function of an amplitude of the ring-down signal as discussed in the following, so that the system can be solved.

Figure 4:
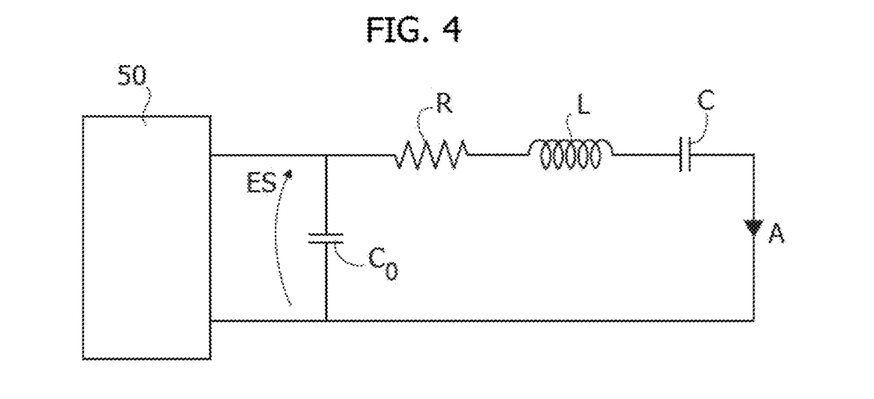
Figure 5:
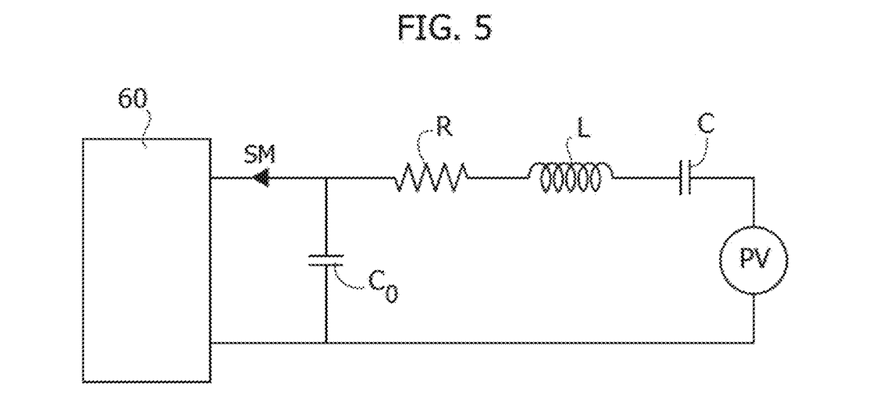

Considering the impedance Z at an input port of the equivalent circuit, a simplified BVD model can be provided for a transmitter transducer (electric to acoustic) and for a receiver transducer (acoustic to electric) as represented in FIG. 4 and FIG. 5, respectively, where parts or elements already discussed in connections with the previous figures are indicated by like reference symbols.

In the transmitter model of FIG. 4, ES represents an (electrical) excitation signal applied to a transmitter transducer device via a (voltage) generator 50 coupled at its nodes (e.g., at electrodes 14a and 14b of the device 10 in FIG. 1) which results in an current flow A in the RLC branch of the circuit, the current A indicative of (proportional to) the (ultra)sound pressure level emitted by the transducer 10.

The circuit as exemplified in FIG. 4 has response or transfer function $H_T(s)$ which may be expressed as:

$$H_T(s) = \frac{A(s)}{ES(s)} = \frac{1}{Z}$$

In the receiver model of FIG. 5, PV represents a voltage indicative of (proportional to) the incident (ultra)sound pressure level (sensed at the membrane layer 12 in FIG. 1, for instance) and SM denotes a measured (current) signal which may be sensed via a transimpedance amplifier 60 coupled at the nodes of the device 10 (e.g., at electrodes 14a and 14b of the device 10 in FIG. 1).

The circuit as exemplified in FIG. 5 has a response or transfer function $H_R(s)$ equal to that of the transmitter mode thanks to reciprocity, so that it may be expressed as:

$$H_R(s) = \frac{SM(s)}{PV(s)} = \frac{1}{Z}$$

For the sake of simplicity, as the response/transfer functions of the receiver/transmitter arrangements are equal, in the following a single, common transfer function G(s) will be referred to in the following discussion.

It is noted that widening the bandwidth BW of the transfer function G(s) of the device 10 without decreasing sensitivity may improve the performance of the latter.

Figure 6:
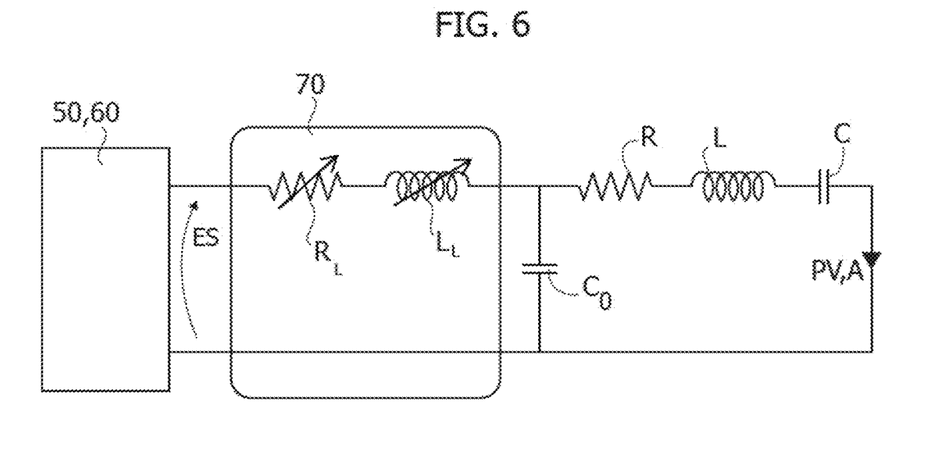
FIGS. 6, 7A and 7B are illustrative of possible exploitation of a model in embodiments.

As exemplified in FIG. 6, an approach in widening the bandwidth of the device 10 may comprise coupling thereto a (passive) load circuit block 70 interposed between the generator 50 (or amplifier 60) and the input port (as modeled by the equivalent network).

For instance, the load circuit block 70 may comprise a load resistor $R_L$ and a load inductor $L_L$ arranged in series between a node of the generator 50 (or amplifier 60) and a node 14a of the BVD model equivalent circuit.

A common transfer function G(s) of an arrangement as exemplified in FIG. 6 may be expressed as:

$$G(s) = \frac{SM(s)}{PV(s)} = \frac{A(s)}{ES(s)} = \frac{Z_{C_0}(s)}{(Z_{C_0}(s) + Z_{RLC}(s))Z_{TOT}(s)}$$

where $Z_{C_0}(s)$ is the impedance of capacitance $C_0$,
$Z_{RLC}(s)$ is the impedance of RLC branch, and
$Z_{TOT}(s)$ is the impedance seen from the input port at ES.

Figure 7A:
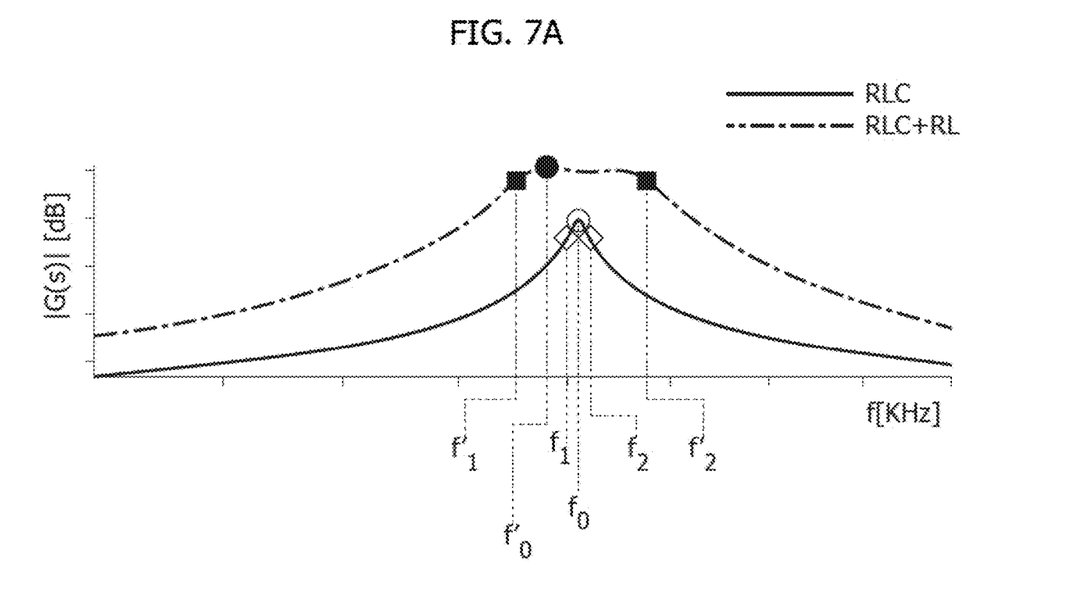
Figure 7B:
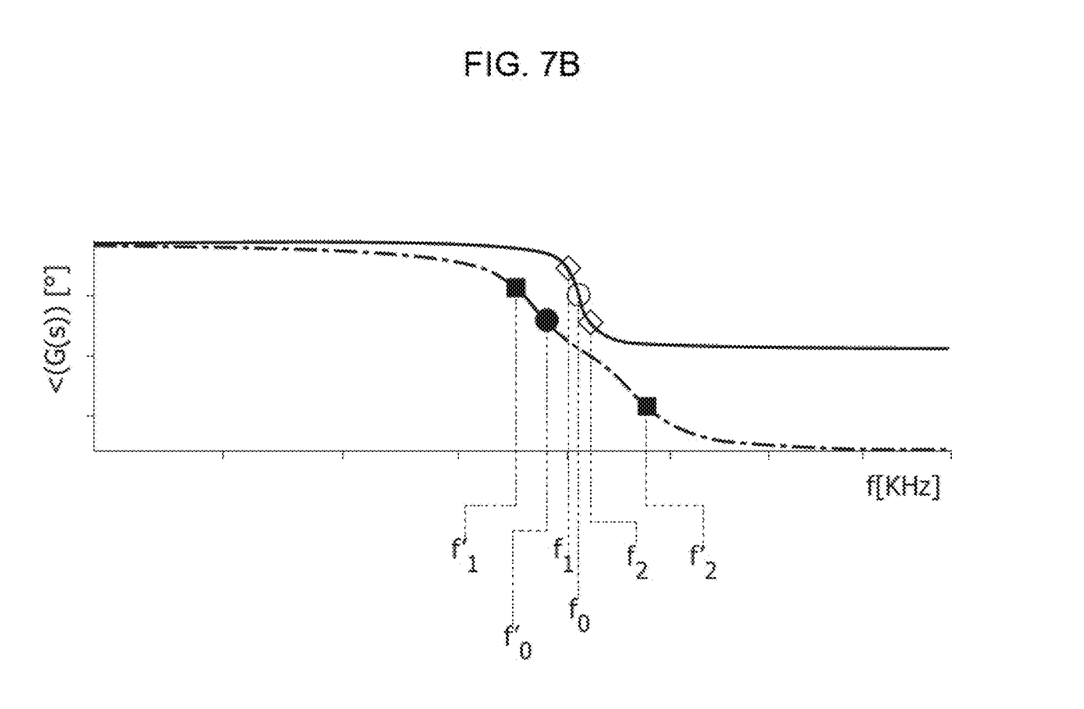

FIGS. 7A and 7B show a comparison of an absolute value |G(s)| and phase <G(s) of the transfer function G(s) versus frequency, respectively, of the arrangement of FIGS. 4, 5 (continuous line, labeled RLC) in comparison with the arrangement of FIG. 6, comprising the load (chain line, labeled RLC+RL).

In the exemplary case of FIGS. 7A, 7B, a resonance frequency of 100 kHz and a fractional bandwidth of 1% can be considered for deriving the parameters of the equivalent circuit based on the BVD model.

As exemplified herein, the parameters R, L, C, $C_0$, as well as the resonance frequency $f_0$ and the decay time T of the BVD model circuit can be measured and calibrated using a method as discussed in US 2020/0292684 A1.

FIGS. 7A and 7B illustrate a transfer function of the circuit as exemplified in FIG. 6 in a case in which the load block 70 comprises a resistor having a (first) resistance value $R_L$ and an inductor L having an inductance value $L_L$ (e.g., about milliHenry), together with a transfer function of the circuit as exemplified in FIG. 4 (or 5).

As exemplified in FIGS. 7A and 7B:
- a ring-shaped marker in FIGS. 7A and 7B is at a first peak frequency $f_0$ for the device 10;
- a point-shaped marker in FIGS. 7A and 7B is at a second peak frequency $f_0'$ for a device 10 coupled to the load 70;
- a pair of diamond-shaped markers indicate a first pair of (−3 dB) cut-off frequencies f1, f2; and
- a pair of square markers indicate a second pair of (−3 dB) cut-off frequencies f1', f2'.

FIGS. 7A and 7B are exemplary of the possibility of broadening the −3 dB bandwidth (referred to the maximum of the absolute value of the transfer function) from a first value BW=1% (RLC) to a second value BW'=6.3% (RLC+RL) as a result of coupling the load block 70 to the device 10.

This result may be appreciated also via simple visual comparison between amplitude values of the transfer functions G(s) of the equivalent circuits for RLC and RLC+RL.

While exemplary of advantageous selections, the quantitative values referred to in the foregoing are not to be construed, even indirectly, as limitative of the embodiments.

FIG. 7A also bears witness to a possible improvement in sensitivity as a result of the load 70 being coupled to the device 10, with the peak (absolute value) of the transfer function G(s) increased, e.g., by +10 dB.

In one or more embodiments, the load block 70 may be configured to (ideally) maximize the bandwidth of the transfer function G(s) while at the same time facilitating compliance of sensitivity with certain specifications.

This may involve a selection of values of parameters, e.g., $R_L$, $L_L$, of the load block 70, determined as a function of the values of parameters R, L, C, C0 of the equivalent network circuit based on the BVD model of FIG. 2.

As exemplified in FIG. 6, the external load 70 may comprise an adjustable (e.g., programmable) load configured to adjust its value in time (for the resistance $R_L$ and/or for the inductor $L_L$).

This may facilitate maintaining a wide bandwidth BW for an extended time period, compensating possible changes of PMUT parameters over time (e.g., due to aging, drift, hysteresis when voltage bias is changed, etc.).

Advantageously, the load inductor $L_L$ may be a "synthetic" inductor, e.g., a circuit configured to emulate the behavior of an inductance as exemplified, for instance, in U. Kumar et al. "Analytical Study of Inductor Simulation Circuits", in *Active and Passive Elec. Comp.*, 1999. Use of such a synthetic inductor may facilitate obtaining values of inductance in the range of milliHenry, as well as facilitating circuit integration.

In one or more embodiments, selecting the notionally "best" values for the load parameters $R_L$, $L_L$ may be burdensome. The external load 70 adds two new poles to the transfer function G(s); ideally, these poles are mutually complex-conjugate and are located at a frequency close to that of the RLC branch of the device 10.

In one or more embodiments, the following scenario may be present:

a) the capacitances of the BVD model circuit C0 and C have values that satisfy the following expression:

$$1 + \frac{C_0}{C} \cong \frac{C_0}{C}$$

b) the transducer may have a very narrow bandwidth (e.g., with Q-factor≈100).

In such an exemplary scenario, it may be possible to compute the approximate values for a load 70 comprising a series arrangement of a resistance $R_{L0}$ and an inductance $L_{L0}$ having values matching the RLC resonant circuit of the BVD model, which may be expressed as follows:

$$R_{L0} = k \cdot R \frac{C}{C_0}$$

$$L_{L0} = L \frac{C}{C_0} = \frac{1}{(2\pi f_0)^2 C_0}$$

where k may be in the range 5 to 10 in order to further increase the bandwidth of the transducer.

In one or more embodiments, in order to take into account cases where the Q-factor may have lower values, e.g., Q-factor≈10, computation of the values of the parameters of the external load 70 may be performed iteratively.

For instance, as computation of the approximate optimal values $R_{L0}$, $L_{L0}$ is based on the BVD model parameters, starting from the computed values, the load parameters $R_L$, $L_L$ may be further adjusted to compensate for other elements of the specific implementation, such as a non-zero output impedance of the voltage generator modelled as block 50 in FIG. 4, for instance.

In order to adapt the model to include any Q-factor value, for instance, the values for the parameters $R_L$, $L_L$ of the load block 70 may be determined iteratively.

As exemplified in FIG. 8, in order to illustrate an exemplary way of iterative determination of the values, different indexes denoted N, M, P and combinations thereof are used in the following to denote a certain number of sample values for a certain parameter, as these parameters may be determined independently from one another.

Figure 8:
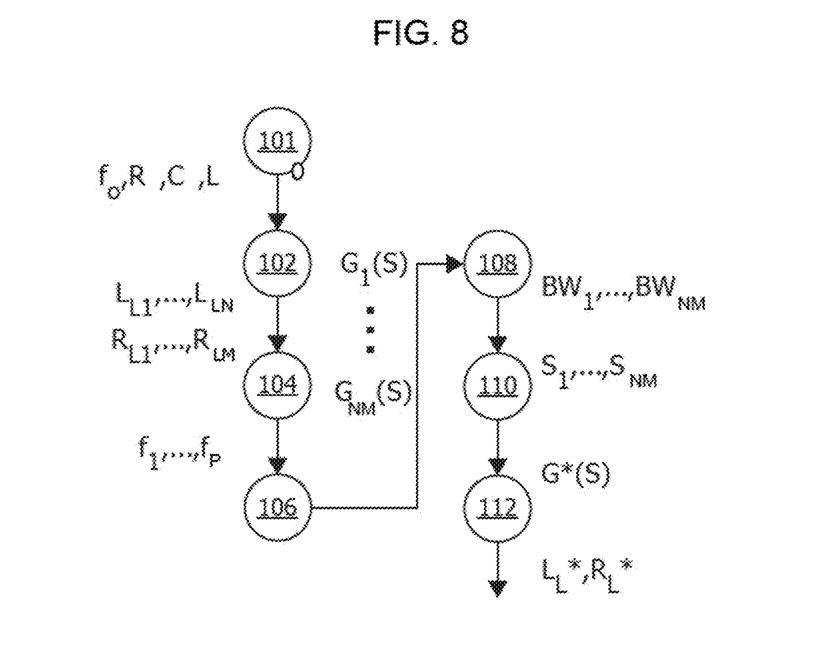
FIG. 8 is a flow chart exemplary of possible acts in embodiments.

For instance, a possible procedure for determining such values may comprise, as exemplified in FIG. 8:

determining (block 100) a BVD model equivalent network circuit of the device 10 and determining (in a manner known per se to those of skill in the art) starting values of its circuit parameters R, L, C, $C_0$ and resonant frequency $f_0$;

producing (block 102) a set of values of a first external load parameter $L_{L1}, \ldots, L_{LN}$ and/or a second external load parameter $R_{L1}, \ldots, R_{LM}$ by sampling, with a certain, e.g., different, sampling step, values within a respective, e.g., different, range, where the range center value is equal to at least one of the computed approximate "best" values $R_{L0}$, $L_{L0}$ of the respective first and/or second parameter;

producing (block 104) a set of frequency values $f_1, \ldots, f_P$ by sampling, with a certain sampling step, values within a frequency range centred around the resonance frequency $f_0$;

computing (block 106) a set of (power spectra of) transfer functions $G_1(s), \ldots, G_{NM}(s)$, each at the set of frequency values $f_1, \ldots, f_P$ by using the first and second set of values obtained for the first and second external load parameters $L_L$, $R_L$;

computing (block 108) a set of bandwidths $BW_1, \ldots, BW_{NM}$ and a set of sensitivities $S_1, \ldots, S_{NM}$ of respective (squared) transfer functions in the set of (squared) transfer functions $G_1(s), \ldots, G_{NM}(s)$ computed;

performing a comparison (block 110) among computed bandwidths and sensitivities, selecting the "best" squared transfer function $G_i(s)$ in the set of squared transfer functions $G_1(s), \ldots, G_{NM}(s)$ which has a relative maximum bandwidth and a sensitivity above or below a certain threshold; and setting (block 112) values for the external load parameters $R_L$, $L_L$ to be equal to the values of external load parameters in the set of values of external load parameters $L_{L1}, \ldots, L_{LN}$ and $R_{L1}, \ldots, R_{LM}$ used to compute the selected "best" squared transfer function in the set of squared transfer functions $G_1(s), \ldots, G_{NM}(s)$.

In one or more embodiments, the threshold for the sensitivity value may be customized as a function of the application for the PMUT device 10.

This approach may neglect some non-idealities or other effects related to the physical PMUT arrangement, and the values found for the external load $R_L$, $L_L$ may be further adjusted in order to compensate for other elements of the specific implementation, such as a non-zero output impedance of the voltage generator modelled as block 50 in FIG. 4, for instance.

In alternative, the load parameters $R_L$, $L_L$ of the external load 70 may be determined using an experimental method, as discussed in the following.

Figure 9:
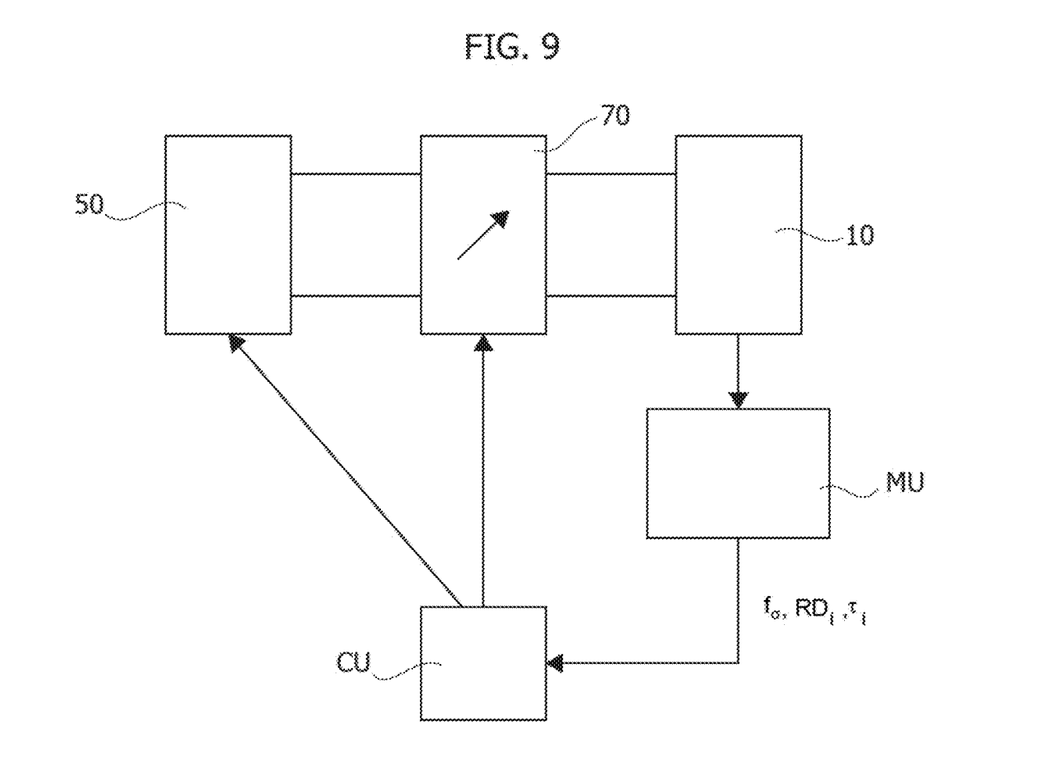
FIG. 9 is exemplary of possible hardware architectures for use in embodiments.

In order to do to, as exemplified in FIG. 9:

the PMUT 10 may be coupled to a measurement unit MU configured to measure its actual resonance frequency $f_6$ and damping parameter Ti; this measurement may be performed in real time, for instance;

the load 70 may comprise components adjustable in real time; as discussed, both the inductor $L_L$ and the resistor $R_L$ may be programmable in real time, for instance; and a control unit CU coupled to the voltage generator 50, the load 70 and the measurement unit MU may be configured (in a manner known per se to those of skill in the art) to receive the measured resonance frequency $f_6$ from the measurement unit MU, control the voltage generator 50 and vary the load parameters $R_L$, $L_L$ as desired.

Figure 10A:
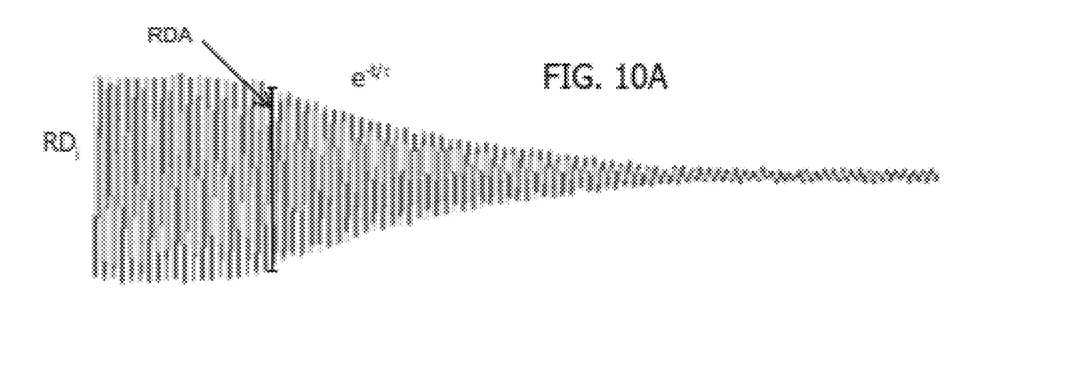
FIGS. 10A and 10B are exemplary of criteria which may be adopted in embodiments in order to identify certain parameters of an electro-acoustical transducer.
Figure 10B:
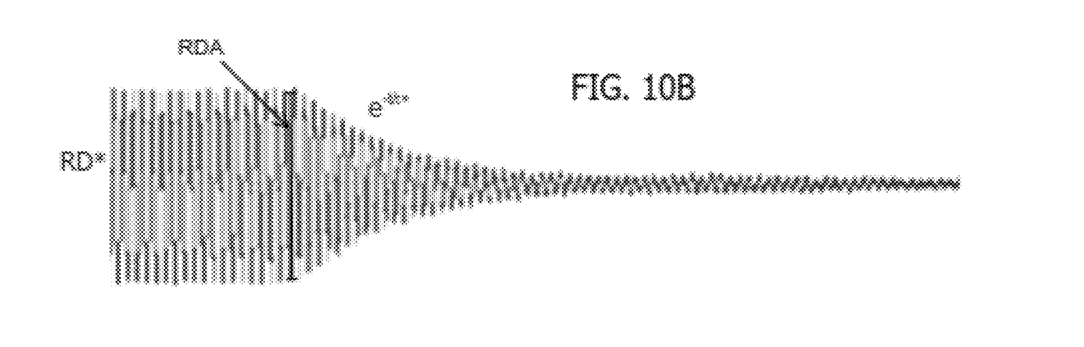

An experimental method for determining the load parameters $R_L$, $L_L$ of the external load 70 in an arrangement as exemplified in FIG. 9, may comprise:

measuring the resonance frequency $f_6$ of the PMUT device 10 (again in a manner known per se to those of skill in the art);

providing a set of values of a first external load parameter $L_{L1}, \ldots, L_{LN}$ and a second external load parameter $R_{L1}, \ldots, R_{LM}$ by sampling, with a certain, e.g., different, sampling step, values within a respective, e.g., different, range centered at the respective value of the computed approximate optimal value $R_{L0}$, $L_{L0}$;

iteratively adjusting, via the control unit CU, for instance, the resistance $R_L$ and inductance $L_L$ of the load 70 to be equal to an i-th value of the first parameter $L_L$ and an i-th value of a second parameter $R_L$ in the set of values provided for the external load parameters $L_{L1}, \ldots, L_{LN}$ and $R_{L1}, \ldots, R_{LM}$;

applying to the device 10 an excitation signal ES, e.g., controlling the generator 50, having a frequency equal to the measured resonance frequency $f_6$;

acquiring, via the measurement unit MU, for instance, an i-th ring-down signal RDi indicative of the ring-down behavior of the transducer 10 after the end of the excitation signal ES;

processing the acquired ring-down signal RDi, obtaining as a result of such processing:

a) an i-th decaying time constant Ti indicative of the bandwidth of the device 10; and b) an (initial, maximum peak-to-peak) amplitude RDA of the ring-down signal, as exemplified in FIG. 10A and FIG. 10B, indicative of the sensitivity of the transfer function G(s) of the device 10;

collecting each i-th decaying time constant Ti and amplitude of the i-th ring-down signal RDi;

performing a comparison, e.g., via the control unit 10, among collected signals indicative of bandwidth and sensitivity, selecting the "best" values of load parameters $L_L^*$, $R_L^*$ in the provided set of values of external load parameters $L_{L1}, \ldots, L_{LN}$ and $R_{L1}, \ldots, R_{LM}$ as a function of said comparison being indicative of a relative maximum bandwidth and a sensitivity above or below a certain threshold; and setting or configuring, e.g., via the control unit 10, the load block 70, e.g., the load resistance and inductance $R_L$, $L_L$, to be equal to the selected "best" values of external load parameters $R_L^*$, $L_L^*$ in set of values of load parameters $L_{L1}, \ldots, L_{LN}$ and $R_{L1}, \ldots, R_{LM}$.

FIGS. 10A and 10B are exemplary of sensed ring-down signals RDi, RD* where:

FIG. 10A is a ring-down signal RDi detected, for instance one without any external load block coupled to the device 10; and FIG. 10B is a (i-th) ring-down signal detected with a load block 70 coupled to the device 10 as exemplified in FIG. 6, for instance that ring-down signal RD* detected whit the load block 70 configured with the "best" load parameters $R_L^*$, $L_L^*$ selected as discussed in the foregoing.

Figure 11:
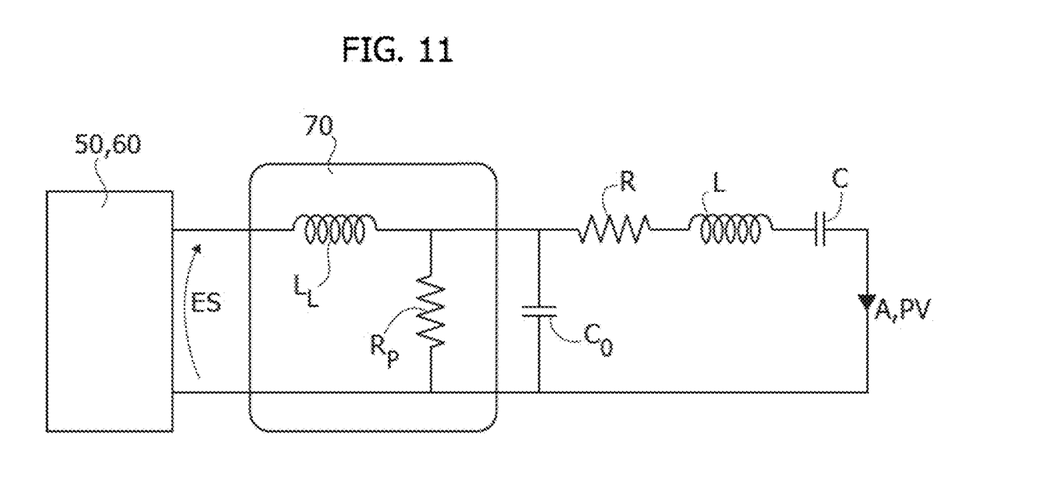
FIGS. 11, 12 and 13 are illustrative of possible alternative exploitations of the model of FIG. 6 in embodiments.
Figure 12:
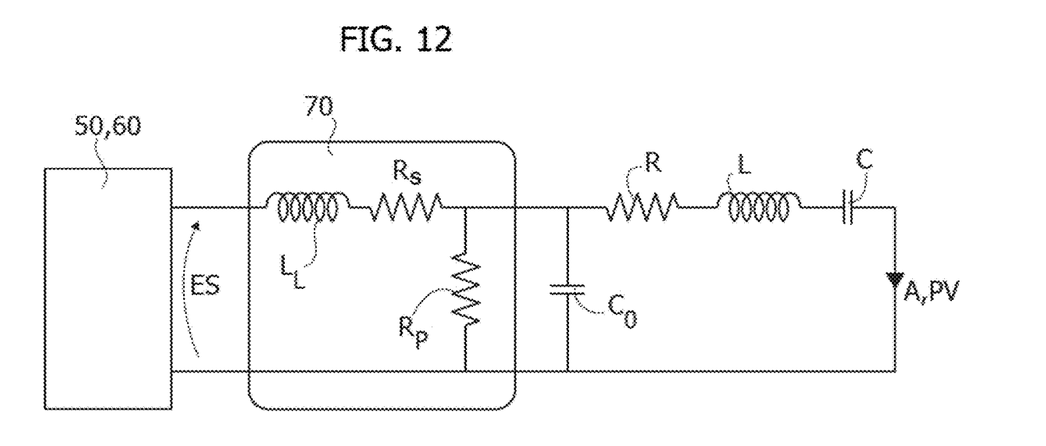
Figure 13:
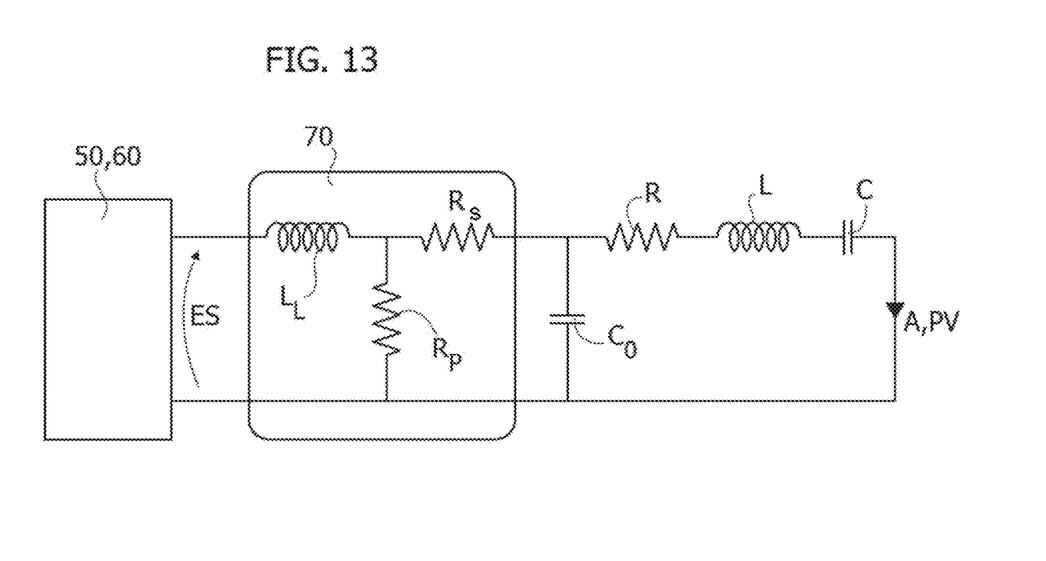

FIGS. 11, 12 and 13 are exemplary of possible alternative architectures of the load block 70.

FIGS. 11 to 13 are exemplary of possible alternative implementations of the load 70 to which the criteria discussed in the foregoing may apply mutatis mutandis:

- as exemplified in FIG. 11, the load 70 comprises a first input node and a second input node configured to receive an input signal ES therebetween as well as a first output node and a second output node, with the inductor $L_L$ arranged intermediate the first input node and the first output node and a resistor $R_P$ arranged intermediate the two output nodes, that is, in parallel with the capacitance $C_0$ in what can be essentially regarded as a voltage divider arrangement of $L_L$ (upper branch) and $R_P$ (lower branch) with the first output node coupled to the partition point of the voltage divider; and
- as exemplified in FIGS. 12 and 13, a further resistor $R_S$ either arranged in series with the inductor $L_L$ (as exemplified in FIG. 12) or intermediate the node at which the inductor $L_L$ is coupled to the resistor $R_P$ and the first output node (as exemplified in FIG. 13).

An arrangement as exemplified in FIG. 11 may be suitable for use and may correspond to that of FIG. 7 if the approximation $C_0 \gg C$ applies and the following equivalence is satisfied:

$$R_P = \frac{L_S C_S}{R_L C_0^2}$$

An arrangement as exemplified in FIGS. 12 and 13 may be suitable for use, and may correspond to that of FIG. 7 when:

a) the approximation that $C_0 \gg C$ applies;
b) the resistors $R_S$ and $R_P$ meet the following condition:

$$\frac{R_S}{R_P} \ll 1$$

c) the resistors $R_S$, $R_P$ as exemplified in FIGS. 12 and 13 are be configured so that the resistor $R_S$ may be expressed as a function of the total load resistance $R_L$, e.g., $R_S = \frac{1}{2} R_L$; and
d) the resistor $R_P$ may be expressed as a function of the total load resistance and the BVD model parameters, e.g., $$R_P = 2 \frac{L_S C_S}{R_L C_0^2}.$$

It is noted that also in arrangements as exemplified in FIGS. 11 to 13 the "best" values for the load parameters RL, LL from which values of the respective arrangement parameters (e.g., Rs, Rp) may be calculated can be determined as discussed in the foregoing with respect to FIG. 7. A corresponding description of the method operations is not repeated for brevity as what discussed in the foregoing, in particular with respect to FIGS. 8 and 9, applies mutatis mutandis.

An arrangement as exemplified in FIGS. 7, 11 to 13 may be suitable for use, for instance, in an acoustic location sensor module 1000, possibly configured to be mounted on a motor vehicle such as a motor car V. As exemplified in FIG. 14, this may comprise an analog front-end 1002 coupled to one or more transducers 10 (PMUTs being exemplary of such transducers) as well as a software component 1004 running on a processing circuit such as a microcontroller unit (MCU) with the peripherals of the processing unit possibly included, at least partly, in the hardware architecture at 1002.

It will be otherwise understood that a microcontroller is just one example of one of a variety of processing units which may be used in embodiments.

Figure 14:
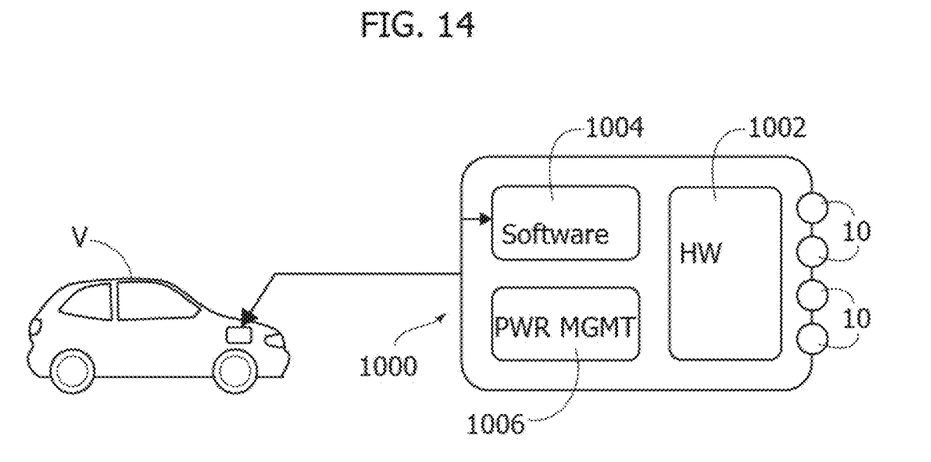
FIG. 14 is exemplary of a system operable according to embodiments.

In one or more embodiments the analog front end 1002 and the processing unit 1004 can be powered via a power management circuit 1006 as desired.

As discussed previously, FIG. 14 is exemplary of a circuit/system architecture configured to host (at 1004, for instance) a software procedure capable of performing adjusting (online, in real time) load parameters such as $R_L$ and $L_L$ of the load block 70 coupled to the device 10 in order to increase its bandwidth BW and possibly its sensitivity, taking into account possible drawbacks related to a narrow available bandwidth available and/or transducer parameters possibly subject to manufacturing spread/changes over time.

As exemplified herein, a method comprises:

- obtaining (for instance, 100) at least one of a resonance frequency (for instance, $f_0$) and at least one ring-down parameter (for instance, $\tau_i$, RDA) of an electro-acoustical transducer (for instance, 10) having a sensitivity and a frequency bandwidth;
- calculating, as a function of said at least one of a resonance frequency and at least one ring-down parameter, a set of model parameters (for instance, R, L, C, $C_0$) of a Butterworth-Van Dyke, BVD, model of the electro-acoustical transducer, the BVD model comprising an equivalent circuit network having a constant capacitance (for instance, $C_0$) coupled to a RLC branch (for instance, R, L, C);
- coupling with the electro-acoustical transducer an adjustable load circuit (for instance, 70), the adjustable load circuit having a set of adjustable load parameters (for instance, $L_L$, $R_L$) comprising at least one resistance parameter ($R_L$) and one inductance parameter (for instance, $L_L$), wherein the adjustable load circuit is coupled with the electro-acoustical transducer at an input port of said equivalent circuit network of said BVD model of the electro-acoustical transducer; and
- adjusting said set of adjustable load parameters as a function of said calculated set of model parameters of said BVD model of said electro-acoustic transducer to increase at least one of said bandwidth and said sensitivity of said electro-acoustic transducer as a result of said adjusting.

As exemplified herein, the method (further) comprises:

- producing (for instance, 102) a set of load candidate values (for instance, $L_{L1}, \ldots, L_{LN}$; $R_{L1}, \ldots, R_{LM}$) for the set of adjustable load parameters, the set of load candidate values including at least one set of initial configuration values (for instance, $R_{L0}$, $L_{L0}$);
- producing (for instance, 104) a set of frequency values (for instance, $f_1, \ldots, f_P$) distributed across a range of frequencies including a frequency value equal to said resonant frequency;
- obtaining (for instance, 106), as a function of said set of frequency values and said set of load candidate values, at least one set of signals (for instance, $G_1(s), \ldots, G_{NM}(s)$) indicative of bandwidth and sensitivity of the electro-acoustic transducer;

performing a comparison (for instance, 110) between a sensitivity threshold and signals in said at least one set of signals obtained, selecting a subset of signals in said at least one set of signals as a result of said comparison;

selecting (for instance, 112) a set of bandwidth-maximizing load candidate values (for instance, $L_L^*$, $R_L^*$) in the set of load candidate values, wherein the bandwidth-maximizing load candidate values are the set of load candidate values in the set of load candidate values corresponding to a bandwidth-maximizing signal (for instance, $G^*(s)$) having a relative maximum bandwidth among said selected subset of signals indicative of bandwidth and sensitivity of the electro-acoustic transducer; and adjusting said set of adjustable load parameters of said adjustable load circuit network to be equal to said set of bandwidth-maximizing load candidate values.

As exemplified herein, obtaining (for instance, 106) at least one set of signals indicative of bandwidth and sensitivity of the electro-acoustic transducer comprises computing a set of frequency responses of the electro-acoustic transducer as a function of said set of frequency values and said set of load candidate values.

As exemplified herein, the method comprises:

producing (for instance, 102) a sequence of load candidate values for the set of adjustable load parameters (for instance, $L_L$, $R_L$), the set of load candidate values including at least one set of initial configuration values;

performing an iterative acquisition of a sequence of ring-down signals indicative of bandwidth and sensitivity of the electro-acoustic transducer coupled to the load circuit network;

performing a comparison (for instance, 110) between a sensitivity threshold and initial amplitude values of the acquired sequence of ring-down signal, selecting a subset of ring-down signals (for instance, RD*) in said sequence of ring-down signals as a result of said comparison;

selecting a set of bandwidth-maximizing load candidate values in the set of load candidate values, wherein the bandwidth-maximizing load candidate values are the set of load candidate values in the set of load candidate values corresponding to a bandwidth-maximizing ring-down signal having a relative maximum bandwidth (for instance, a least a damping parameter T*) among said sequence of ring-down signals indicative of bandwidth and sensitivity of the electro-acoustic transducer; and adjusting said set of adjustable load parameters to be equal to said set of bandwidth-maximizing load candidate values.

As exemplified herein, said iterative acquisition comprises, for each candidate value in the sequence of load candidate values, a sequence of operations comprising:

i) adjusting the set of adjustable load parameters of said adjustable load circuit network to be equal to an i-th load candidate value in the set of load candidate values;

ii) applying to the transducer an excitation signal (for instance, 50, ES) over an excitation interval; and iii) acquiring (for instance, 60, PV) at the transducer a ring-down signal indicative of the ring-down behavior of the transducer after the end of the excitation interval.

As exemplified herein, said set of initial configuration values for said load circuitry comprises at least one of:

i) an inductance initial configuration value $L_0$ expressed as:

$$L_{L0} = L\frac{C}{C_0} = \frac{1}{(2\pi f_0)^2 C_0}$$

ii) an initial resistance configuration value $R_{L0}$ expressed as:

$$R_{L0} = k \cdot R\frac{C}{C_0}$$

where
C, C0, R, L, $f_0$ are parameters of the calculated BVD model, and
k is a numeric value, preferably in a 5 to 10 numeric range.

As exemplified herein, a circuit comprises:

at least one electro-acoustical transducer (for instance, 10) having a sensitivity and a frequency bandwidth;

an adjustable load circuit (for instance, 70) having a set of adjustable load parameters (for instance, $L_L$, $R_L$) comprising at least one of a resistance parameter (for instance, $R_L$) and an inductance parameter (for instance, $L_L$); and processing circuitry (for instance, 50, 60, MU, CU) coupled to said at least one electro-acoustical transducer and said adjustable load circuitry, the processing circuitry configured to perform said acts of:

obtaining (for instance, 100) at least one of a resonance frequency (for instance, $f_0$) and at least one ring-down parameter (for instance, $\tau_i$, RDA) of the electro-acoustical transducer;

calculating said set of model parameters (for instance, R, L, C, C0) of a Butterworth-Van Dyke, BVD, model of the electro-acoustical transducer; and adjusting said set of adjustable load parameters as a function of said calculated set of model parameters of said BVD model in the method as exemplified herein.

As exemplified herein, the electro-acoustical transducer being an ultrasound electro-acoustical transducer, preferably a Piezoelectric Micromachined Ultrasonic Transducers, PMUT.

As exemplified herein, said adjustable load circuit comprises one of:

the series connection of a resistor (for instance, $R_L$) and an inductor (for instance, $L_L$); and a voltage divider comprising an inductor (for instance, $L_L$) and at least one resistor (for instance, $R_P$, $R_S$).

As exemplified herein, a device comprises a circuit as exemplified herein, the device selected out of:

an obstacle detection device, preferably a vehicle-mounted (for instance, V) device;

an echo-location device; and a sound-wave time-of-flight measurement device.

Without prejudice to the underlying principles, the details and the embodiments may vary, even significantly, with respect to what has been described by way of example only, without departing from the scope of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   obtaining at least one resonance frequency of a plurality of resonance frequencies and at least one ring-down parameter of a plurality of ring-down parameters of an electro-acoustical transducer having a sensitivity and a frequency bandwidth;
   calculating, as a function of the at least one of a resonance frequency and at least one ring-down parameter, a set of model parameters of a Butterworth-Van Dyke (BVD) model of the electro-acoustical transducer, the BVD model including an equivalent circuit network having a constant capacitance coupled to a RLC branch;
   coupling with the electro-acoustical transducer an adjustable load circuit, the adjustable load circuit having a set of adjustable load parameters including at least one resistance parameter and one inductance parameter, wherein the adjustable load circuit is coupled with the electro-acoustical transducer at an input port of the equivalent circuit network of the BVD model of the electro-acoustical transducer;
   adjusting the set of adjustable load parameters as a function of the calculated set of model parameters of the BVD model of the electro-acoustic transducer to increase at least one of the bandwidth and the sensitivity of the electro-acoustic transducer as a result of the adjusting;
   producing a sequence of load candidate values for the set of adjustable load parameters, the set of load candidate values including at least one set of initial configuration values; and
   performing an iterative acquisition of a sequence of ring-down signals indicative of the bandwidth and the sensitivity of the electro-acoustic transducer coupled to the load circuit.

2. The method of claim 1, comprising:
   producing a set of load candidate values for the set of adjustable load parameters, the set of load candidate values including at least one set of initial configuration values;
   producing a set of frequency values distributed across a range of frequencies including a frequency value equal to the resonant frequency;
   obtaining, as a function of the set of frequency values and the set of load candidate values, at least one set of signals indicative of bandwidth and sensitivity of the electro-acoustic transducer;
   performing a comparison between a sensitivity threshold and signals in the obtained at least one set of signals, and selecting a subset of signals in the at least one set of signals as a result of the comparison;
   selecting a set of bandwidth-maximizing load candidate values in the set of load candidate values, wherein the bandwidth-maximizing load candidate values are the set of load candidate values in the set of load candidate values corresponding to a bandwidth-maximizing signal having a relative maximum bandwidth among the selected subset of signals indicative of bandwidth and sensitivity of the electro-acoustic transducer; and
   adjusting the set of adjustable load parameters of the adjustable load circuit to be equal to the set of bandwidth-maximizing load candidate values.

3. The method of claim 2, wherein obtaining at least one set of signals indicative of bandwidth and sensitivity of the electro-acoustic transducer includes computing a set of frequency responses of the electro-acoustic transducer as a function of the set of frequency values and the set of load candidate values.

4. The method of claim 2, comprising:
   producing a sequence of load candidate values for the set of adjustable load parameters, the set of load candidate values including at least one set of initial configuration values;
   performing an iterative acquisition of a sequence of ring-down signals indicative of bandwidth and sensitivity of the electro-acoustic transducer coupled to the load circuit;
   performing a comparison between a sensitivity threshold and initial amplitude values of the acquired sequence of ring-down signals, and selecting a subset of ring-down signals in the sequence of ring-down signals as a result of the comparison;
   selecting a set of bandwidth-maximizing load candidate values in the set of load candidate values, wherein the bandwidth-maximizing load candidate values are the set of load candidate values in the set of load candidate values corresponding to a bandwidth-maximizing ring-down signal having a relative maximum bandwidth among the sequence of ring-down signals indicative of bandwidth and sensitivity of the electro-acoustic transducer; and
   adjusting the set of adjustable load parameters to be equal to the set of bandwidth-maximizing load candidate values.

5. The method of claim 1, comprising:
   performing a comparison between a sensitivity threshold and initial amplitude values of the acquired sequence of ring-down signals, and selecting a subset of ring-down signals in the sequence of ring-down signals as a result of the comparison;
   selecting a set of bandwidth-maximizing load candidate values in the set of load candidate values, wherein the bandwidth-maximizing load candidate values are the set of load candidate values in the set of load candidate values corresponding to a bandwidth-maximizing ring-down signal having a relative maximum bandwidth among the sequence of ring-down signals indicative of bandwidth and sensitivity of the electro-acoustic transducer; and
   adjusting the set of adjustable load parameters to be equal to the set of bandwidth-maximizing load candidate values.

6. The method of claim 5, wherein the iterative acquisition comprises, for each candidate value in the sequence of load candidate values, a sequence of operations comprising:
   adjusting the set of adjustable load parameters of the adjustable load circuit to be equal to a load candidate value in the set of load candidate values;
   applying to the transducer an excitation signal over an excitation interval; and
   acquiring at the transducer a ring-down signal indicative of the ring-down behavior of the transducer after the end of the excitation interval.

7. The method of claim 1, wherein a set of initial configuration values for the load circuitry includes at least one of:

an inductance initial configuration value $L_0$ expressed as:

$$L_{L0} = L\frac{C}{C_0} = \frac{1}{(2\pi f_0)^2 C_0}$$

or an initial resistance configuration value $R_{L0}$ expressed as:

$$R_{L0} = k \cdot R\frac{C}{C_0}$$

where
C, C0, R, L, f0 are parameters of the calculated BVD model where
C represents a capacitance;
C0 represents the constant capacitance;
R represents a resistance;
L represents a inductance;
f0 represents the resonance frequency; and
k is a numeric value.

8. The method of claim 7, wherein k is a numeric value within a range from 5 to 10.

9. A circuit, comprising:
at least one electro-acoustical transducer having a sensitivity and a frequency bandwidth;
an adjustable load circuit having a set of adjustable load parameters comprising at least one resistance parameter and one inductance parameter; and
processing circuitry coupled to the at least one electro-acoustical transducer and the adjustable load circuitry, the adjustable load circuit having a set of adjustable load parameters including at least one resistance parameter and one inductance parameter, the processing circuitry configured to:
obtain at least one resonance frequency of a plurality of resonance frequencies and at least one ring-down parameter of a plurality of ring-down parameters of the electro-acoustical transducer;
calculate, as a function of the at least one of a resonance frequency and at least one ring-down parameter, a set of model parameters of a Butterworth-Van Dyke (BVD) model of the electro-acoustical transducer, the BVD model including an equivalent circuit network having a constant capacitance coupled to a RLC branch, wherein the adjustable load circuit is coupled with the electro-acoustical transducer at an input port of the equivalent circuit network of the BVD model of the electro-acoustical transducer;
adjust the set of adjustable load parameters as a function of the calculated set of model parameters of the BVD model of the electro-acoustic transducer to increase at least one of the bandwidth and the sensitivity of the electro-acoustic transducer;
produce a set of load candidate values for the set of adjustable load parameters, the set of load candidate values including at least one set of initial configuration values;
produce a set of frequency values distributed across a range of frequencies including a frequency value equal to the resonant frequency;
obtain, as a function of the set of frequency values and the set of load candidate values, at least one set of signals indicative of bandwidth and sensitivity of the electro-acoustic transducer; and perform a comparison between a sensitivity threshold and signals in the obtained at least one set of signals, and select a subset of signals in the at least one set of signals as a result of the comparison.

10. The circuit of claim 9, wherein the processing circuitry is configured to:
select a set of bandwidth-maximizing load candidate values in the set of load candidate values, wherein the bandwidth-maximizing load candidate values are the set of load candidate values in the set of load candidate values corresponding to a bandwidth-maximizing signal having a relative maximum bandwidth among the selected subset of signals indicative of bandwidth and sensitivity of the electro-acoustic transducer; and
adjust the set of adjustable load parameters of the adjustable load circuit to be equal to the set of bandwidth-maximizing load candidate values.

11. The circuit of claim 10, wherein the processing circuitry is configured to obtain at least one set of signals indicative of bandwidth and sensitivity of the electro-acoustic transducer by computing a set of frequency responses of the electro-acoustic transducer as a function of the set of frequency values and the set of load candidate values.

12. The circuit of claim 10, wherein the processing circuitry is configured to:
produce a sequence of load candidate values for the set of adjustable load parameters, the set of load candidate values including at least one set of initial configuration values;
perform an iterative acquisition of a sequence of ring-down signals indicative of bandwidth and sensitivity of the electro-acoustic transducer coupled to the load circuit;
perform a comparison between a sensitivity threshold and initial amplitude values of the acquired sequence of ring-down signals, and select a subset of ring-down signals in the sequence of ring-down signals as a result of the comparison;
select a set of bandwidth-maximizing load candidate values in the set of load candidate values, wherein the bandwidth-maximizing load candidate values are the set of load candidate values in the set of load candidate values corresponding to a bandwidth-maximizing ring-down signal having a relative maximum bandwidth among the sequence of ring-down signals indicative of bandwidth and sensitivity of the electro-acoustic transducer; and
adjust the set of adjustable load parameters to be equal to the set of bandwidth-maximizing load candidate values.

13. The circuit of claim 9, wherein the processing circuitry is configured to:
perform an iterative acquisition of a sequence of ring-down signals indicative of bandwidth and sensitivity of the electro-acoustic transducer coupled to the load circuit;
perform a comparison between a sensitivity threshold and initial amplitude values of the acquired sequence of ring-down signals, and selecting a subset of ring-down signals in the sequence of ring-down signals as a result of the comparison;
select a set of bandwidth-maximizing load candidate values in the set of load candidate values, wherein the bandwidth-maximizing load candidate values are the set of load candidate values in the set of load candidate values corresponding to a bandwidth-maximizing ring-down signal having a relative maximum bandwidth among the sequence of ring-down signals indicative of bandwidth and sensitivity of the electro-acoustic transducer; and adjust the set of adjustable load parameters to be equal to the set of bandwidth-maximizing load candidate values.

14. The circuit of claim 13, wherein the iterative acquisition comprises, for each candidate value in the sequence of load candidate values, a sequence of operations comprising:
adjusting the set of adjustable load parameters of the adjustable load circuit to be equal to a load candidate value in the set of load candidate values;
applying to the transducer an excitation signal over an excitation interval; and
acquiring at the transducer a ring-down signal indicative of the ring-down behavior of the transducer after the end of the excitation interval.

15. The circuit of claim 9, wherein the electro-acoustical transducer comprises an ultrasound electro-acoustical transducer.

16. The circuit of claim 15, wherein the electro-acoustical transducer comprises a Piezoelectric Micromachined Ultrasonic Transducer.

17. The circuit of claim 9, wherein the adjustable load circuit comprises one of:
the series connection of a resistor and an inductor; or
a voltage divider comprising an inductor and at least one resistor.

18. A device, comprising:
a circuit including:
at least one electro-acoustical transducer having a sensitivity and a frequency bandwidth;
an adjustable load circuit having a set of adjustable load parameters comprising at least one resistance parameter and one inductance parameter; and
processing circuitry coupled to the at least one electro-acoustical transducer and the adjustable load circuitry, the adjustable load circuit having a set of adjustable load parameters including at least one resistance parameter and one inductance parameter, the processing circuitry configured to:
obtain at least one resonance frequency of a plurality of resonance frequencies and at least one ring-down parameter of a plurality of ring-down parameters of the electro-acoustical transducer;
calculate, as a function of the at least one of a resonance frequency and at least one ring-down parameter, a set of model parameters of a Butterworth-Van Dyke (BVD) model of the electro-acoustical transducer, the BVD model including an equivalent circuit network having a constant capacitance coupled to a RLC branch, wherein the adjustable load circuit is coupled with the electro-acoustical transducer at an input port of the equivalent circuit network of the BVD model of the electro-acoustical transducer; and
adjust the set of adjustable load parameters as a function of the calculated set of model parameters of the BVD model of the electro-acoustical transducer to increase at least one of the bandwidth and the sensitivity of the electro-acoustic transducer;
produce a set of load candidate values for the set of adjustable load parameters;
obtain at least one set of signals indicative of bandwidth and sensitivity of the electro-acoustic transducer;
perform a comparison between a sensitivity threshold and signals in the obtained at least one set of signals, and select a subset of signals in the at least one set of signals as a result of the comparison;
select a set of bandwidth-maximizing load candidate values in the set of load candidate values, wherein the bandwidth-maximizing load candidate values are the set of load candidate values in the set of load candidate values corresponding to a bandwidth-maximizing signal having a relative maximum bandwidth among the selected subset of signals indicative of bandwidth and sensitivity of the electro-acoustic transducer; and
adjust the set of adjustable load parameters of the adjustable load circuit to be equal to the set of bandwidth-maximizing load candidate values.

19. The device of claim 18, wherein the processing circuitry is configured to:
produce a set of frequency values distributed across a range of frequencies including a frequency value equal to the resonant frequency; and
obtain, as a function of the set of frequency values and the set of load candidate values, the at least one set of signals indicative of bandwidth and sensitivity of the electro-acoustic transducer.

20. The device of claim 19, wherein the processing circuitry is configured to obtain at least one set of signals indicative of bandwidth and sensitivity of the electro-acoustic transducer by computing a set of frequency responses of the electro-acoustic transducer as a function of the set of frequency values and the set of load candidate values.

* * * * *